Oct. 14, 1969  K. J. NISPER ET AL  3,472,521
PISTON RING LATCH

Filed Dec. 28, 1967  2 Sheets-Sheet 1

INVENTORS
KENNETH J. NISPER
ROBERT LAKANEN
BY
ATTORNEYS

Oct. 14, 1969   K. J. NISPER ET AL   3,472,521
PISTON RING LATCH

Filed Dec. 28, 1967   2 Sheets-Sheet 2

INVENTORS
KENNETH J. NISPER
ROBERT LAKANEN
BY
ATTORNEYS

United States Patent Office 3,472,521
Patented Oct. 14, 1969

1

3,472,521
PISTON RING LATCH
Kenneth J. Nisper, Spring Lake, and Robert Lakanen, Muskegon, Mich., assignors to Muskegon Piston Ring Company, Muskegon, Mich., a corporation of Michigan
Filed Dec. 28, 1967, Ser. No. 698,372
Int. Cl. F16j 15/00, 9/24; F16k 41/00
U.S. Cl. 277—140                              8 Claims

ABSTRACT OF THE DISCLOSURE

The invention is an accessory for parted piston rings and for the expander-spacers for parted piston rings which are formed from thin metal. It consists of a tie band slidably secured within the cross-sectional silhouette of the ring and bridging the part or gap in the ring. The tie band provides a connection between these ends while leaving them free to be separated when it is necessary to spread the ends for installation of the ring on a piston.

BACKGROUND OF THE INVENTION

The invention is an accessory for piston rings which serves as a guide and aligner for the ends when the ring is installed on the piston. It is an installation accessory and serves no function, once the ring is installed. Most piston rings for the oil ring groove are a combination ring utilizing a flexible expander-spacer rolled to its cross-sectional shape from a thin ribbon of metal. Of the total cross-sectional area of such rings there is only a small portion which actually is occupied by metal. The rest is a void or open space. The ends of such rings frequently do not precisely butt when the ring is installed, resulting in faulty operation. This is a frequent cause of faulty engine operation and sometimes even of engine failure. So far as is known, nothing has ever been provided for the guidance and alignment of the ends of the open cross-section type of expander-spacer for which this invention is particularly adapted.

SUMMARY OF THE INVENTION

This invention incorporates on a conventional piston ring or expander-spacer of open cross section a rod or band which bridges the gap formed at the ring gap, when it is opened for installation. The band is preferably secured to the ring adjacent one of its ends and slidably and telescopically engages the other of its ends, permitting the ends to open by one end sliding along the rod. As the ends are closed, the rod guides the ends into aligned abutment. Thereafter, the rod remains stored within the ring and serves no further functional purpose. The attachment of the rod to the ring is made by means of snap-on anchors, permitting installation after the manufacture of the ring is complete and requiring no modification of the ring itself.

2

Figure 3:
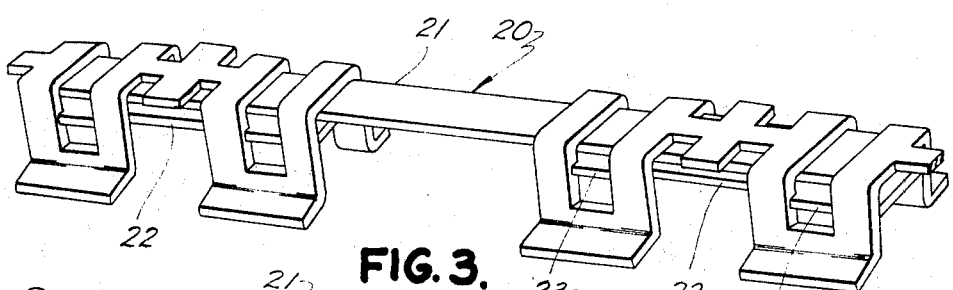
FIG. 3 is a fragmentary oblique view of a modified form of the latch of this invention.
Figure 6:
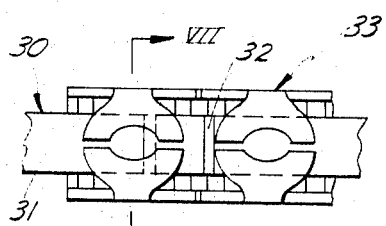
FIG. 6 is a fragmentary elevation view of the radial inner face of a ring having the latch of FIG. 5 assembled to a ring.
Figure 7:
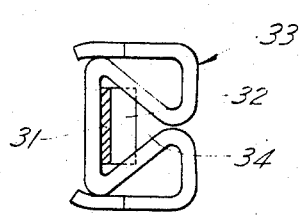
Figure 8:
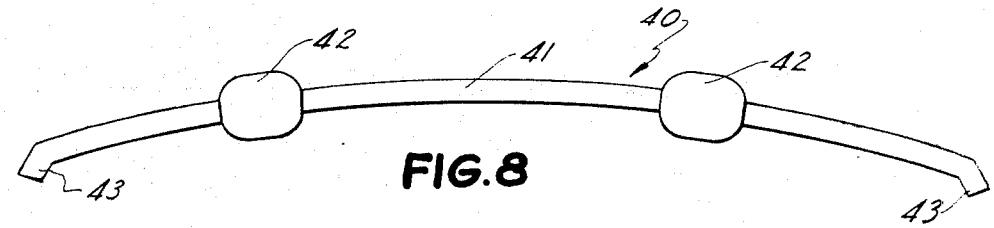
Figure 9:
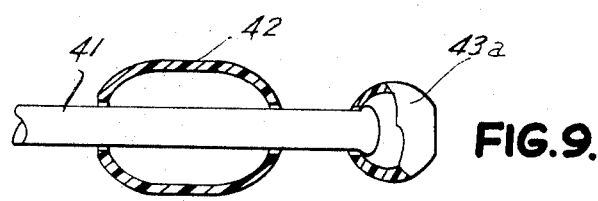
Figure 10:
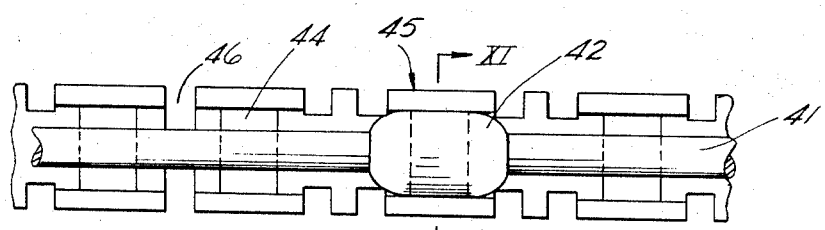
Figure 11:
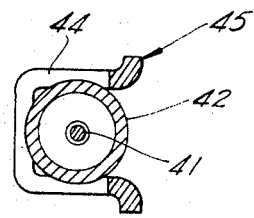
Figure 12:
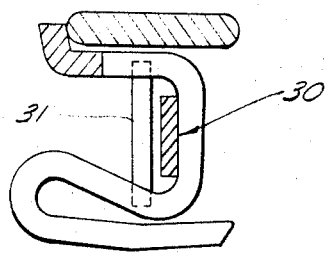

FIG. 7 is a sectional elevation view taken along the plane VII—VII of FIG. 6;

FIG. 8 is an enlarged plan view of a further embodiment of the latch structure used in this invention;

FIG. 9 is a fragmentary, broken, cross-sectional view of one of the anchors and of a modified terminal for the latch shown in FIG. 8;

FIG. 10 is a fragmentary elevation view of the inner diameter face of a ring of the type illustrated in FIG. 3 with the latch of the type illustrated in FIG. 8 assembled thereto;

FIG. 11 is a sectional elevation view taken along the plane XI—XI of FIG. 10;

FIG. 12 is a sectional elevation view illustrating the installation of the latch of FIG. 3 in a ring of entirely different cross-section.

DESCRIPTION OF THE PREFERRED EMBODIMENT

Figure 1:
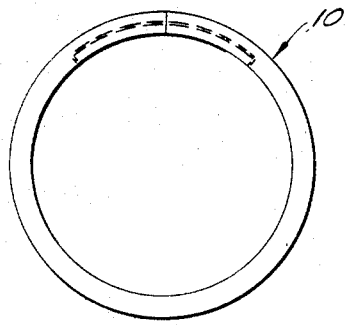
FIG. 1 is a plan view of a ring incorporating this invention, showing the ring in closed position.
Figure 2:
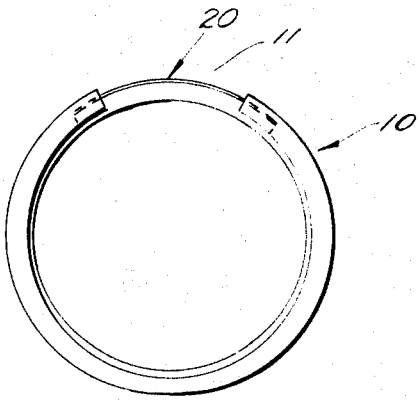
FIG. 2 shows the same ring as FIG. 1 expanded to pass over a piston.

Referring specifically to FIGS. 1 and 2, the numeral 10 indicates a piston ring which may be of any of numerous conventional designs. Basically, it is a ring formed from a ribbon of thin metal. Therefore, it has only a minor portion of its cross section occupied by metal. Rings of this type are illustrated in U.S. Patents 3,191,948 entitled "Piston Ring," issued June 29, 1965, and 3,212,785, entitled "Oil Ring," issued Oct. 19, 1965, and U.S. Patent 3,174,760 entitled "Piston Ring," issued Mar. 23, 1965. From a review of these issued patents it will be noted that each of these rings has certain features in common. One of these is that each of the rings has a circumferential channel or opening extending radially of the ring, more or less adjacent its center. Another characteristic is that this channel is accessible from either the radial outer or radial inner face of the ring. Another characteristic is that the ring has slots or openings extending generally axially of the ring which becomes important in the attachment of this invention.

Figure 4:
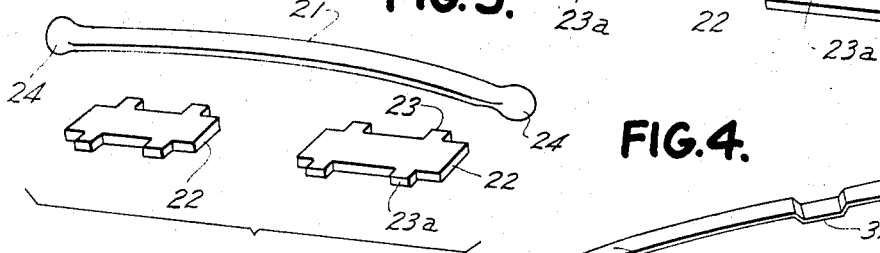
FIG. 4 is an exploded view of the elements making up the latch shown in FIG. 3.

FIGS. 3 and 4 illustrate a latch 20 having a band or bar 21 of generally rectangular cross section. The bar is curved to conform to the curvature of the ring. The latch is illustrated as applied to the type of ring disclosed in U.S. Patent 3,174,760 entitled "Piston Ring," issued Mar. 23, 1965, by the anchor plates 22. As illustrated in FIG. 4, these are flat plates each with a pair of spaced ears 23 on one side, and 23a on the other side. After the bar has been seated within the channel of the ring, the plates 22 are pressed into the ring with the ears 23 and 23a seating in a pair of slots in the ring. Since these rings are hardened to be resilient, the size of the ring may be slightly expanded, if necessary, to permit the ears to pass into the slots. This will not cause permanent deformation of the ring. The length of the ears is such that they do not project beyond the side of the ring, and thus both the bar 21 and the anchor plates 22 are entirely confined within the cross-sectional silhouette of the ring. The plates allow the ends of the ring to slide freely on the rod until the terminal beads or stops 24 are encountered.

It has been found that nylon of a certain type is a satisfactory material for the fabrication of the bar 21 and the anchor plates 22. An example of a nylon which has been successfully tested is a 6—6 type, sold by E. I. du Pont de Nemours as number 101, military specification Mil. P—4606(MR). Tests indicate that when used on the oil ring, the operating temperatures are below that at which failure of this nylon occurs. When nylon is utilized, the beads 24 may be formed by melting the ends of the bar 21 or by any other suitable means. Other synthetic materials may be usable, provided either they withstand the operating temperatures or upon failure they vaporize or otherwise disintegrate without leaving a residue which would clog the openings in the ring or interfere with its freedom of movement. It will be recognized that in situations requiring operating temperatures above that permissible with synthetic materials, the latch can be fabricated of metal.

Figure 5:
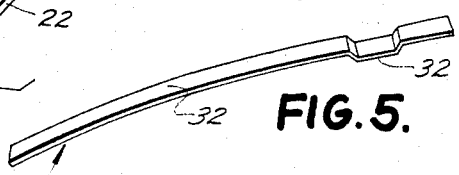
FIG. 5 is an oblique view of the rod used in another embodiment of this invention.

Another embodiment of this invention is illustrated in FIGS. 5, 6 and 7 wherein the latch 30 consists of a thin, flat bar 31 which may be of nylon or a similar synthetic resinous material of a resilient metal such as spring steel or tempered bronze. The bar 31 has an offset anchor 32 formed adjacent one end. The latch 30 is installed by inserting the end with the anchor through the central passage of a ring 33. The resiliency of the latch permits sufficient deflection to enable it to be inserted lengthwise of the ring until it locks by snapping into place, preventing further circumferential movement. This arrangement is illustrated in FIGS. 6 and 7. In these figures, it is shown installed in a ring 33 having a generally tubular central passage 34 of the type disclosed in U.S. Patent 3,212,785 entitled "Oil Ring," issued Oct. 19, 1965.

A further embodiment of the invention is illustrated in FIGS. 8–11 wherein the latch 40 consists of a rod 41 which slidably passes through a pair of beads 42. As shown in FIG. 9, the beads 42 are preferably hollow to reduce the weight and thereby inertia and momentum during the operation of the ring. This, however, is not an absolute essential to the invention, especially if the rod and beads are of a low weight material such as nylon. It is important that the rod 41 be capable of sliding freely through the beads 42. The rod 41 is curved on a radius conforming to the radius of the particular size ring with which it will be used.

The ends of the rod are provided with stops which in FIG. 8 are the crimped end portions 43. As suggested in FIG. 9, the end of the rod can be inserted into a ball 43a and headed to lock the ball on the end of the rod. Either one will serve the purpose of preventing the rod from pulling entirely through either one of the beads 42. The latch 40, as above described, is preassembled and is then installed in the ring. The embodiment of the latch, when the beads 42 are hollow, is particularly adapted to fabrication from metal.

The assembly of the latch to the ring is illustrated in FIGS. 10 and 11. The beads 42 are moved along the rod 41 until each of the beads is aligned with one of the slots 44 in the ring 45 with one bead on each side of the gap or part 46. The bead is then pressed into the channel in the ring with a very slight rounding portion of the bead being trapped in the slot. It is important that the size of the bead 42 is such that it does not deflect the sides of the ring outwardly nor does any portion of the bead project beyond the silhouette of the ring proper. Only a small frictional engagement is necessary to lock the bead in place sufficiently for the practice of this invention. It is also important that no portion of the bead 42 project into the gap 46 and thereby prevent closure of the ends of the ring. When the latch is installed, the curvature of the rod 41 must parallel the curvature of the ring so that the ring, as it is opened and closed, slides easily along the rod. Also, the rod must be completely stored within the ring when the part 46 is closed without binding between the rod and the ring whereby the rod would interfere with the freedom of radial movement of the ring while it is operating. The presence of the terminal stops 43 or 43a prevent the ring from being opened so far that the rod would be disengaged from the beads or the ring distorted by excessive separation of its ends.

FIG. 12 illustrates the latch 20 installed on a ring of different configuration than that shown in FIGS. 3 and 4. It will be seen from this figure that this invention may be utilized in rings of substantially different construction from the specific rings used for illustrative purposes in describing the invention itself.

This invention provides a positive guide by which the ends of the ring are forced to move toward each other by following the band or rod when the ring is closed. As such, the ends of the ring are positively aligned when they come into abutment. Thus, the problem of misalignment or cocking of the ends of the rings is eliminated. This includes the problem of one end overlapping the other. Misalignment, overlapping and cocking are serious because they cause distortion of the ring in that area. This can and frequently results in damage to the cylinder bore. It also causes misalignment of any rails which are used with the ring and affects the amount of radial tension applied to the rail. The amount of radial tension is precisely predetermined for each ring and failure to provide the prescribed radial tension value can seriously impair the ring's effectiveness. Both too much and too little radial tension impairs the sealing characteristics of the ring. Cocked rings frequently bind or jam in the ring groove restricting the ring's freedom of radial movement. This produces a leaky ring, ineffective for its primary purpose.

It will be readily seen that the invention is used only at the time of installation. Once the ring is seated in its ring groove and the ends are butted the invention serves no further purpose and thereafter remains with the ring throughout its life without changing the characteristics of the ring. It is important that the strength of the latch be such as only enough to guide the ring ends together and thus not form a rigid resistance to the flexing of the ring after it is put into operation.

While several embodiments of this invention have been described, it will be recognized that other embodiments may be made within the teachings of this invention.

We claim:

1. In a parted piston ring having a major portion of its cross section void and in cross section shaped to form a circumferential channel accessible from one radial face of said ring, means to guide the ends of said ring together when the part therein is closed, said means comprising: a rod curved lengthwise to the general curvature of said ring and bridging the gap formed at the part when the ring is opened sufficiently to pass the ring over a piston; an anchor element seated in said channel and frictionally locked to said ring adjacent one of the ends of said ring and securing one end of said rod to said ring; the other end of said rod being telescopically received in the channel at the other end of said ring and slidable with respect to said other end of said ring; said anchor elements slidably engaging said rod and holding it assembled to said ring; the ends of said ring element sliding along said rod as said ring is closed until said ends abut, said rod guiding said ends into abutment in aligned relationship; said rod and anchor elements being within said channel and said rod when said ring is closed being stored within said channel.

2. The piston ring described in claim 1 wherein said rod is a wire of circular cross section and said anchor element is bead-like in shape having an aperture extending therethrough; said rod passing slidably through said aperture.

3. The piston ring described in claim 2 wherein a second anchor element is provided secured to said ring in said channel adjacent said other end of said ring; a stop member is provided on each end of said rod, said stop members engaging said anchor elements to limit the opening movement of said ring.

4. A piston ring as described in claim 1 wherein said rod is rectangular in cross section with its surfaces of greater dimension facing radially of said ring; said anchor element being an offset in said rod adjacent one end.

5. The piston ring described in claim 1 wherein said rod is rectangular in cross section, with its surfaces of greater dimension facing radially of said ring; a second anchor element; both of said anchor elements being plates mounted in said channel to form a passageway between the plates and one radial wall of said ring; said rod being slidable through said passageway; said anchor elements being one adjacent each end of said ring.

6. The piston ring described in claim 5 wherein a stop member is provided on each end of said rod, said stop members engaging said anchor elements to limit the opening movement of said ring.

7. A parted piston ring having a major portion of its cross section void and in cross section being shaped to form a circumferential channel accessible from one face of said ring, said ring forming three walls of said channel, said walls having a plurality of circumferentially spaced apertures therein, means to guide the ends of said ring together when the part is closed, said means comprising; a rod curved lengthwise to the general curvature of said ring and bridging the gap formed at the part when the ring is opened sufficiently to pass the ring over a piston; an anchor element seated in said channel adjacent each of the ends of said ring; portions of each of said anchor elements extending into one of said apertures and frictionally engaging the walls thereof for holding the anchor elements stationary with respect to said ring; said anchor elements slidably engaging said rod and holding it assembled to said ring; the ends of said ring sliding along said rod as said ring is closed until said ends abut, said rod guiding said ends into abutment in aligned relationship; said rod and anchor elements being within said channel and said rod when said ring is closed being stored within said channel, all portions of said anchor elements being within the cross-sectional silhouette of said ring.

8. The piston ring described in claim 7 wherein said anchor elements are plates mounted in said channel to form a passageway between the plates and one radial wall of said ring; said rod being slidable through said passageway; said plates having tabs on each side thereof, said tabs being seated in said apertures and engaging the walls thereof for securing said anchor elements to said ring.

References Cited

UNITED STATES PATENTS

| 608,184 | 8/1898 | Derbyshire | 277—140 X |
| 2,778,697 | 1/1957 | Nuttall | 267—1.5 |
| 3,261,612 | 7/1966 | Games | 277—140 |

FOREIGN PATENTS

| 171,017 | 4/1960 | Sweden. |

LOUIS K. RIMRODT, Primary Examiner

PO-1050
(5/69)

UNITED STATES PATENT OFFICE
CERTIFICATE OF CORRECTION

Patent No. 3,472,521      Dated October 14, 1969

Inventor(s) K. J. Nisper, et al.

It is certified that error appears in the above-identified patent and that said Letters Patent are hereby corrected as shown below:

Column 3, Line 10:

Change "or" to --- of ---.

SIGNED AND
SEALED
MAY 5 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,472,521         Dated October 14, 1969

Inventor(s) Kenneth J. Nisper, et al

It is certified that error appears in the above-identified patent and that said Letters Patent are hereby corrected as shown below:

Column 4, line 47;

Please change "anchor elements" to --- anchor element ---;

Column 4, line 52;

Please change "anchor elements" to --- anchor element ---.

Signed and sealed this 5th day of September 1972.

(SEAL)
Attest:

EDWARD M. FLETCHER JR.          ROBERT GOTTSCHALK
Attesting Officer                Commissioner of Patents